United States Patent [19]

Norton

[11] Patent Number: 4,678,565
[45] Date of Patent: Jul. 7, 1987

[54] PURIFIED WATER STORAGE SYSTEM WITH ACCUMULATOR TANK AND DIAPHRAGM RESPONSIVE VALVES

[75] Inventor: William W. Norton, Lincolnshire, Ill.

[73] Assignee: Culligan International Company, Northbrook, Ill.

[21] Appl. No.: 819,799

[22] Filed: Jan. 17, 1986

[51] Int. Cl.[4] .................................................. B01D 13/00
[52] U.S. Cl. .................................. 210/110; 210/134; 210/137; 210/257.2; 210/433.2
[58] Field of Search ............ 210/110, 116, 137, 257.2, 210/433.2, 134, 135, 321.1

[56] References Cited

U.S. PATENT DOCUMENTS

| | | | |
|---|---|---|---|
| 3,333,699 | 8/1967 | Bliss et al. | 210/134 |
| 3,493,496 | 2/1970 | Bray et al. | 210/257.2 |
| 3,505,216 | 4/1970 | Kryzer | 210/134 X |
| 3,542,199 | 11/1970 | Bray et al. | 210/257.2 X |
| 3,616,921 | 11/1971 | Bray | 210/257.2 X |
| 3,670,892 | 6/1972 | Baerg et al. | 210/134 |
| 3,786,924 | 1/1974 | Huffman | 210/257.2 |
| 3,794,173 | 2/1974 | Bray | 210/257.2 |
| 3,846,295 | 11/1974 | Gibbs | 210/257.2 X |
| 3,887,463 | 6/1975 | Bray | 210/257.2 X |
| 3,959,146 | 5/1976 | Bray | 210/257.2 |
| 4,021,343 | 5/1977 | Tyler | 210/257.2 X |
| 4,086,166 | 4/1978 | Martin | 210/257.2 |
| 4,176,063 | 11/1979 | Tyler | 210/257.2 |
| 4,190,537 | 2/1980 | Tondreau et al. | 210/257.2 X |
| 4,347,132 | 8/1982 | Davis | 210/257.2 X |
| 4,391,712 | 7/1983 | Tyler et al. | 210/257.2 |
| 4,482,456 | 11/1984 | Grayson | 210/257.2 X |

FOREIGN PATENT DOCUMENTS 1445799  8/1976  United Kingdom ............ 210/257.2

Primary Examiner—David Sadowski
Attorney, Agent, or Firm—George H. Gerstman

[57] ABSTRACT

A system is provided for supplying purified water, without requiring continuous flow of water across the water purification device. A reverse osmosis unit is provided having an unpurified water inlet, a reject water outlet and a product water outlet. The unpurified water inlet is connected to a source of unpurified water. The reject water outlet and the product water outlet are connected to water regulating means. The water regulating means has outlets to drain and to an accumulator tank. When pressure in the accumulator tank is below a predetermined amount, a diaphragm responsive to the pressure operates a pair of spool valves to first automatically direct a first amount of product water only to drain. Thereafter, the spool valves automatically discontinue flow of the first amount of product water to drain and direct the product water to the accumulator tank. In this manner, the first amount of water which has been standing and was subject to osmosis and/or excessive bacteria multiplication does not enter the accumulator tank.

8 Claims, 5 Drawing Figures

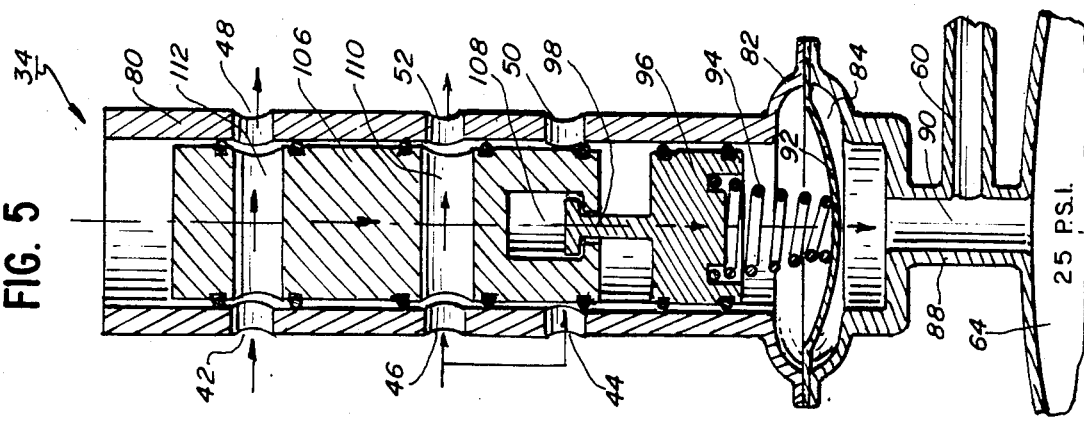
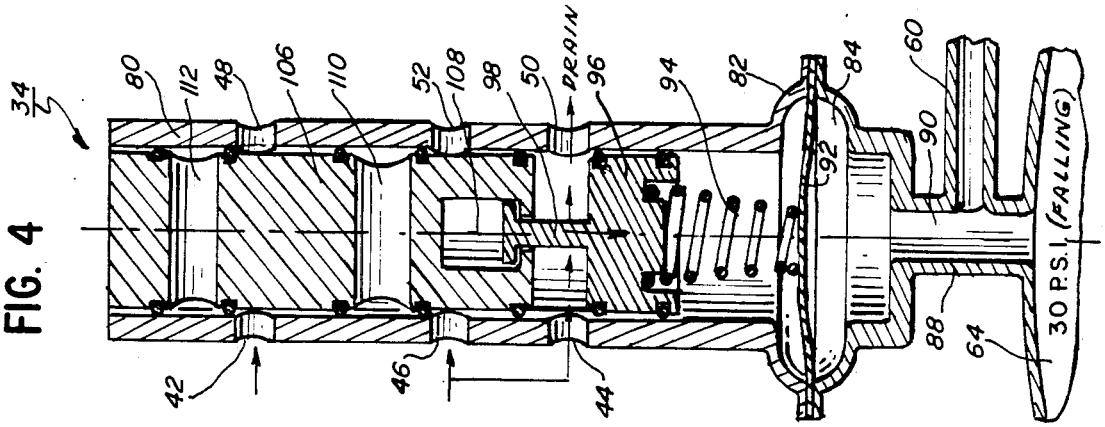
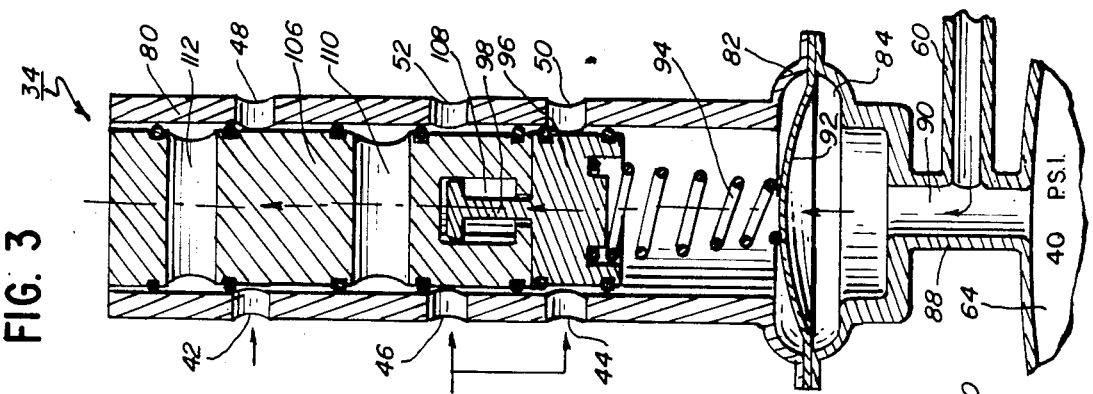
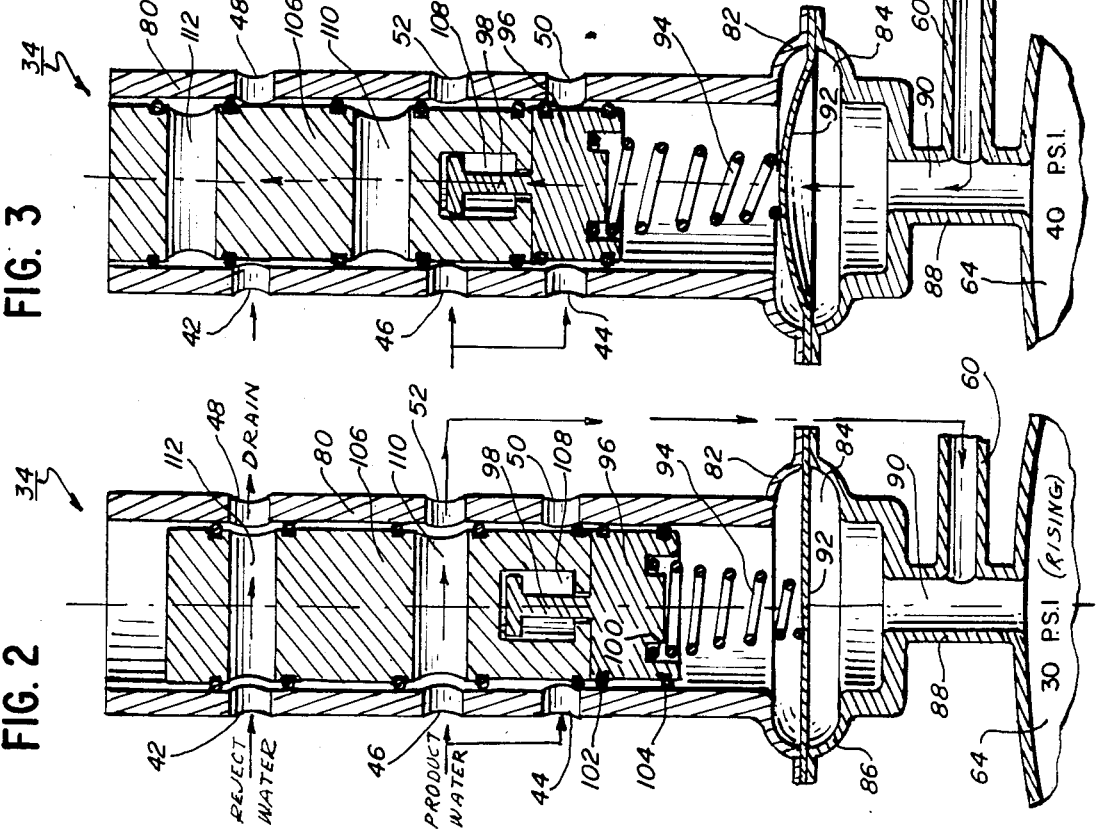

PURIFIED WATER STORAGE SYSTEM WITH ACCUMULATOR TANK AND DIAPHRAGM RESPONSIVE VALVES

BACKGROUND OF THE INVENTION

The present invention concerns a novel system for supplying and/or storing purified water.

Systems for supplying purified water are widely used today in residences, officers and factories. In one type of purified water supply system, as disclosed in Bray, et al. U.S. Pat. No. 3,493,496, unpurified water is directed to a reverse osmosis unit. The product water from the reverse osmosis unit is directed to an accumulator tank for storage. In the Bray et al. system, a pressure differential is always maintained across the reverse osmosis membrane. To accomplish the maintenance of the pressure differential across the reverse osmosis membrane, a pressure relief valve is used so that when a certain pressure is reached within the accumulator tank the pressure relief valve will cause the product water to be directed to drain.

It can be seen that the Bray et al. system requires continuous flow of water, and it is believed that this continuous flow overcomes the osmotic and bacteriological problems created in the water that is standing between the reverse osmosis membrane and the accumulator tank if there was no continuous flow.

While the flow of water into the accumulator tank is useful, the use of a pressure relief valve to direct water to drain once the accumulator tank is filled, is wasteful of water, provides a constant noise, and is illegal in certain regions.

In order to obviate the difficulties concomitant with a continuous flow of product water, another type of purified water supply system utilizes a shutoff valve which automatically shuts off the flow of water to the reverse osmosis unit once the accumulator tank has reached a certain pressure. The disadvantage of this system, however, is that there may be bacteriological and osmotic problems in the water that has been standing between the reverse osmosis unit and the accumulator tank.

In Tyler et al. U.S. Pat. No. 4,391,712 a reverse-osmosis water purifier apparatus is disclosed which does not require continuous flow of the product water and which enables a first quantity of water from the reverse-osmosis filter to flow to drain. However, Tyler et al. requires the use of a hydraulic accumulation tank to divert the first quantity of water from the reverse-osmosis filter which may be expensive, complex and bulky.

I have discovered a system in which the aforementioned problems concomitant with continuous flow and also the aforementioned problems concomitant with the use of a shutoff valve are alleviated, without requiring the use of a hydraulic accumulator tank to divert the first quantity of water.

BRIEF DESCRIPTION OF THE INVENTION

In the illustrative embodiment, a purified water storage and supply system is provided. The system includes a reverse osmosis unit having an inlet, a reject water outlet, a product water outlet, and a reverse osmosis membrane. The inlet is connected to a supply of unpurified water. As used herein, the term "unpurified water" connotes water that is less pure than the water that has exited from the water purification unit.

In the illustrative embodiment, a purified water storage and supply system is provided. The system includes a reversed osmosis unit having an inlet, a reject water outlet, a product water outlet, and a reverse osmosis membrane. The inlet is connected to a supply of unpurified water. As used herein, the term "unpurified water" connotes water that is less pure than the water that has exited from the water purification unit.

In the illustrative embodiment, water regulating means having a first inlet coupled to the reject water outlet, a second inlet coupled to the product water outlet, a first outlet coupled to drain, and a second outlet coupled to an accumulator tank. The accumulator tank has an inlet coupled to the second outlet and an outlet coupled to a point of use. The water regulating means comprises a pair of valves movable in response to the pressure in the accumulator tank for automatically directing reject water to drain and for automatically directing a first amount of product water only to drain and thereafter discontinuing the direction of the product water to drain and instead directing the product water to the second outlet. The valves are operated by a diaphragm that is responsive to pressure in the accumulator tank.

In the illustrative embodiment, an activated carbon filter is interposed between the accumulator tank outlet and the point of use, which is preferably a household faucet. The valves comprises a pair of spool valves movable within a common cylindrical housing.

A more detailed explanation of the invention is provided in the following description and claims, and is illustrated in the accompanying drawings.

BRIEF DESCRIPTION OF THE DRAWINGS

FIGS. 2, 3, 4 and 5 comprise partially broken, cross-sectional elevations of the water regulating means used in the system of FIG. 1, which each figure showing the valves within the water regulation means in a different state.

DETAILED DESCRIPTION OF THE ILLUSTRATIVE EMBODIMENT

Figure 1:
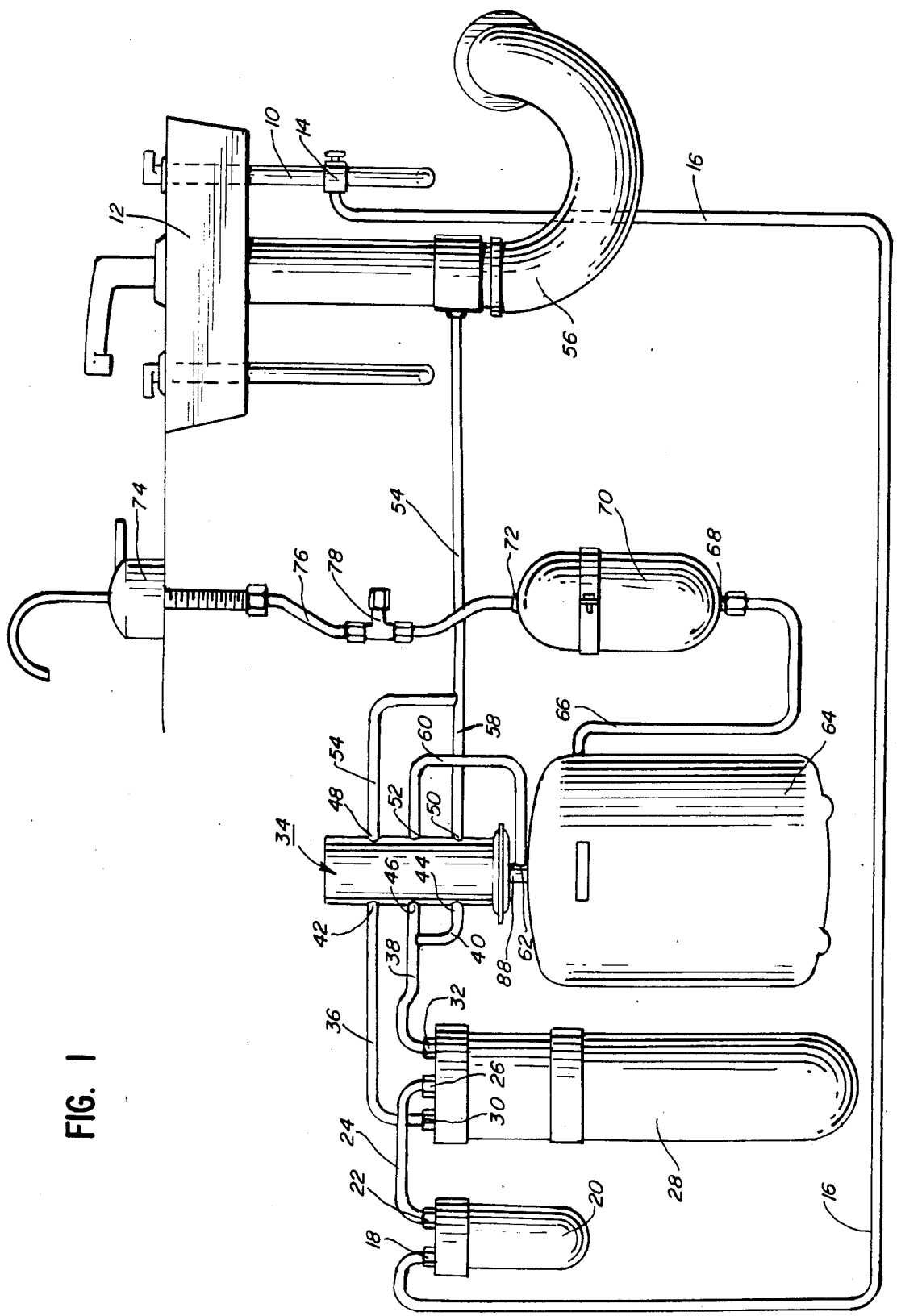
FIG. 1 is a schematic diagram of a purified water storage and supply system constructed in accordance with the principles of the present invention.

Referring to FIG. 1, the purified water storage and supply system shown therein is connected to the cold water line 10 in a residence, such as used with a kitchen faucet system 12. Piercing valve 14 couples the cold, unpurified water line 16 to the household's cold water line 10. Line 16 is connected to the inlet 18 of a prefilter 20, the output 22 of which is coupled via line 24 of the inlet 26 of reverse osmosis membrane unit 28. Reverse osmosis membrane unit 28 is a conventional unit, having inlet 26, reject water outlet 30, and product water outlet 32. The reject water outlet is connected to a water regulating unit 34 via conduit 36. The product water from reverse osmosis membrane unit 28 is conveyed to water regulation unit 34 via conduit 38 with branch 40. Thus water regulating unit 34 has a reject water inlet 42, a first product water inlet 44, a second product water inlet 46, a reject water outlet 48, a first product water outlet 50, and a second product water outlet 52. A line 54 connects reject outlet 48 to drain pipe 56. A line 58 connects first product water outlet 50 to drain line 54.

The second product water outlet 52 of water regulating unit 34 is connected by pipe 60 to inlet 62 of accumulator tank 64. Accumulator tank 64 may be of a type well-known in the art, including a plastic-lined chamber and pressurized by air behind a rubber diaphragm. The outlet of accumulator tank 64 is coupled via conduit 66 to the inlet 68 of an activated carbon filter 70, the outlet 72 of which is connected to a household faucet 74 via conduit 76. An ice-maker tee 78 may be connected in the line 76 so as to direct the purified water to an ice-maker.

The water regulating unit 34, and its connection to accumulator tank 64, is shown in detail in FIGS. 2-5. Referring to these figures, it can be seen that water regulating unit 34 comprises a cylindrical housing 80, the lower portion of which is contiguous with the top 82 of a diaphragm housing 84. Bottom 86 of diaphragm housing 84 is connected by a fitting 88 to accumulator tank 34 so that there is communication via bore 90 of fitting 88 with the interior of accumulator tank 64.

A diaphragm 92 is seated between top member 82 and bottom member 86 of the diaphragm housing and the top of diaphragm 92 is coupled via spring 94 to a first valve spool 96 which carries a tractor coupling 98. The first, or lower, spool 96 defines a circular recess 100 for receiving spring 94, and a pair of O-rings 102, 104 allows spool 96 to ride within cylindrical housing 80, in sealing engagement therewith.

A second valve spool 106 defines an opening 108 for receipt of tractor coupling 98, whereby tractor coupling 98 can ride vertically within opening 108. Upper spool 106 defines a product water passage 110 and a reject water passage 112. The upper spool 106 is encircled by a number of O-rings to allow it to move vertically within cylindrical housing 80 with a sealing engagement.

In order to understand the operation of the water regulation unit 34, reference is first made to FIG. 2. In the FIG. 2 illustration, pressure in the accumulator tank is at 30 psi, with the pressure rising, indicating that the accumulator tank 64 is being filled with product water. It can be seen that diaphragm 92 is in a position whereby spring 94 has located spool 96 in the illustrated location with upper spool 106 resting on spool 96. In this position, the reject water which enters inlet 42 will flow through passage 112 to outlet 48 and from there to drain. The product water entering inlet 46 will flow via passage 110 to outlet 52 and from there via conduit 60 to accumulator tank 64. The product water that is at inlet 44 is blocked.

Once the accumulator tank 64 has been filled to a selected amount and the pressure has risen to a selected amount, for example, 40 psi, diaphragm 92 will be in the position illustrated in FIG. 3. In this position, spools 96 and 106 have been forced upwardly as illustrated in FIG. 3. The reject water at inlet 42 is blocked and the product water at inlets 46 and 44 is blocked. Thus when the accumulator tank is filed, there will be no flow of water. This alleviates the problems concomitant with a continuous flow system such as disclosed in Bray et al. U.S. Pat. No. 3,493,496.

Now assume that the household faucet 74 (FIG. 1) has been operated so that water from the accumulator tank 64 is being used. When the pressure decreases to a selected level, for example, 30 psi, and is falling, spools 96 will drop as illustrated changing the configuration of the valves, allowing the product water at inlet 44 to flow to outlet 50 and to drain. This is the first amount of product water that flows after all flow of water has stopped. By referring to FIG. 4, it can be seen that while spool 96 has dropped to allow the product water to flow via inlet 44 and outlet 50 to drain, spool 106 has not yet dropped to allow any other water flow. However, a short time later, spool 106 will be pulled downward by tractor coupling 98, as illustrated in FIG. 5, so that reject water inlet 42 and outlet 48 will be aligned with passage 112, thereby directing reject water to drain. In addition, product water inlet 46 and outlet 52 will be aligned with passage 110, allowing the product water to flow via conduit 60 to accumulator tank 64. As the pressure within accumulator tank 64 rises, diaphragm 92 will operate to force spool 94 upwardly, back to the position of FIG. 2, whereby the cycle will again begin.

In order to provide friction for spool 106 so that it will move as desired, it is preferred that detents be provided. The system may be adjusted so that a selected amount of first product water will be directed to drain when the system is in its FIG. 4 position.

It can thus be seen that while the pressure in the accumulator tank is low and the accumulator tank is being filled with purified water, the product water flows into the accumulator tank while the reject water flows to drain. Once the accumulator tank has obtained a sufficient amount of water, all flow will stop so that there is no continuous flow of product water creating wasted water and obnoxious noise. When the accumulator tank requires more water, the first amount of product water will not be directed into the accumulator tank but instead will be directed to drain. Thereafter, the product water will be directed into the accumulator tank until sufficient pressure in the accumulator tank is reached.

Although an illustrative embodiment of the invention has been shown and described, it is to be understood that various modifications and substitutions may be made by those skilled in the art without departing from the novel spirit and scope of the present invention.

What is claimed is:

1. A purified water supply system which comprises:
   a reverse osmosis device having a reverse osmosis membrane, an inlet, a purified water outlet, and a reject water outlet;
   means for coupling the reverse osmosis device inlet to a supply of unpurified water;
   water regulating means having inlets coupled to said purified water outlet and said reject water outlet, said water regulating means having a first outlet and a second outlet;
   first means coupling said first outlet to drain;
   only one accumulator tank having an inlet and an outlet;
   means coupling said outlet to said accumulator tank inlet;
   means coupling said accumulator tank outlet to a household faucet;
   said water regulating means comprising a pair of valves movable in response to pressure in the accumulator tank for automatically directing a first amount of water from said purified water outlet to said first outlet and thereafter automatically discontinuing flow of the water to said first outlet and directing flow of the water from said purified water outlet to said second outlet;
   said valves including means for providing two different configurations depending upon pressure in the accumulator tank;
   including means a diaphragm responsive to pressure in the accumulator tank for direct mechanically linked operation of said valves without requiring another accumulator tank;

said water regulating means being operative to couple said reject water outlet to drain.

2. A purified water supply system as described in claim 1, in which said pair of valves is mounted on the accumulator tank.

3. A purified water storage and supply system, which comprises:

a reverse osmosis unit having an inlet, a reject water outlet, a product water outlet, and a reverse osmosis membrane;

means for coupling said inlet to supply of unpurified water;

water regulating means having a first inlet coupled to said reject water outlet, a second inlet coupled to said product water outlet, a first outlet coupled to drain, and a second outlet only one accumulator tank having an inlet coupled to said second outlet and an outlet coupled to a point of use;

said water regulating means comprising a pair of valves movable in response to pressure in the accumulator tank for automatically directing reject water to drain and for automatically directing a first amount of product water only to drain and thereafter discontinuing the directing of said product water to drain and instead directing the product water to said second outlet; said valves including means for providing two different configurations depending upon pressure in the accumulator tank; and including means a diaphragm responsive to pressure in the accumulator tank for direct mechanically linked operation of said valves without requiring another accumulator tank.

4. A purified water storage and supply system as described in claim 3, including an activated carbon filter interposed between the accumulator tank outlet and the point of use.

5. A purified water storage and supply system as described in claim 3, said pair of valves comprising an upper spool valve and a lower spool valve movable within a common cylindrical housing.

6. A purified water storage and supply system as described in claim 5, said first inlet, second inlet, first outlet and second outlet being defined by openings in said cylindrical housing.

7. A purified water storage and supply system as described in claim 3, said point of use comprising a household faucet.

8. A purified water storage and supply system as described in claim 3, in which said pair of valves is mounted on the accumulator tank.

* * * * *